United States Patent [19]
DeMusis

[11] 3,988,126
[45] Oct. 26, 1976

[54] MACHINE FOR RESURFACING TURBINE VANES

[76] Inventor: Ralph T. DeMusis, 547 Foxon Road, North Branford, Conn. 06471

[22] Filed: Dec. 2, 1974

[21] Appl. No.: 528,839

[52] U.S. Cl. .............................. 51/100 R; 51/143; 51/147; 51/217 R
[51] Int. Cl.² .................. B24B 17/02; B24B 19/14
[58] Field of Search ............ 51/47, 92 R, 99, 100 R, 51/100 P, 142, 143, 147, 217 R

[56] References Cited
UNITED STATES PATENTS

| | | | |
|---|---|---|---|
| 1,841,411 | 1/1932 | Kux | 51/143 |
| 2,675,652 | 4/1954 | Chiappulini | 51/100 R |
| 2,803,095 | 8/1957 | La Monica | 51/100 R |
| 3,239,967 | 3/1966 | Volk | 51/100 R |
| 3,331,166 | 7/1967 | Brenning | 51/217 R |
| 3,423,885 | 1/1969 | Crandall | 51/217 R |
| 3,528,200 | 9/1970 | Allen | 51/143 |
| 3,589,075 | 6/1971 | Carlson | 51/94 R X |
| 3,751,856 | 8/1973 | Jorgensen | 51/99 X |
| 3,818,646 | 6/1974 | Peterson | 51/217 R |

*Primary Examiner*—Al Lawrence Smith
*Assistant Examiner*—Nicholas P. Godici
*Attorney, Agent, or Firm*—H. Gibner Lehmann; K. Gibner Lehmann

[57] ABSTRACT

A resurfacing machine and method for repairing turbine vanes and the like, the machine comprising a bed carrying a pair of supports which are capable of limited advancing and retracting movement with respect to one another. One of the supports is slidably carried on a pair of substantially parallel, coextensive guide bars mounted by the bed, and has a camming device engageable with a cam follower disposed on the other support. The latter is mounted for pivotal movement on the bed, and carries a motor driven sanding belt adapted to engage a workpiece clamped in place on a work-performing station of the first support. The movement of the first support is such that the workpiece is brought into engagement with the sanding belt as the support moves. Simultaneously, the cam follower is engaged by the cam, causing pivotal movement of the second support in such a way that the particular contour or shape of the cam is imparted to the workpiece. Means are provided for effecting automatic advancing and retracting movement of the first support on the bed, and for halting such movement when predetermined positions have been attained. Additional means are provided for adjusting the position of the cam with respect to the first support and workpiece, thus enabling variation in the degree of resurfacing of the particular vane being machined.

11 Claims, 19 Drawing Figures

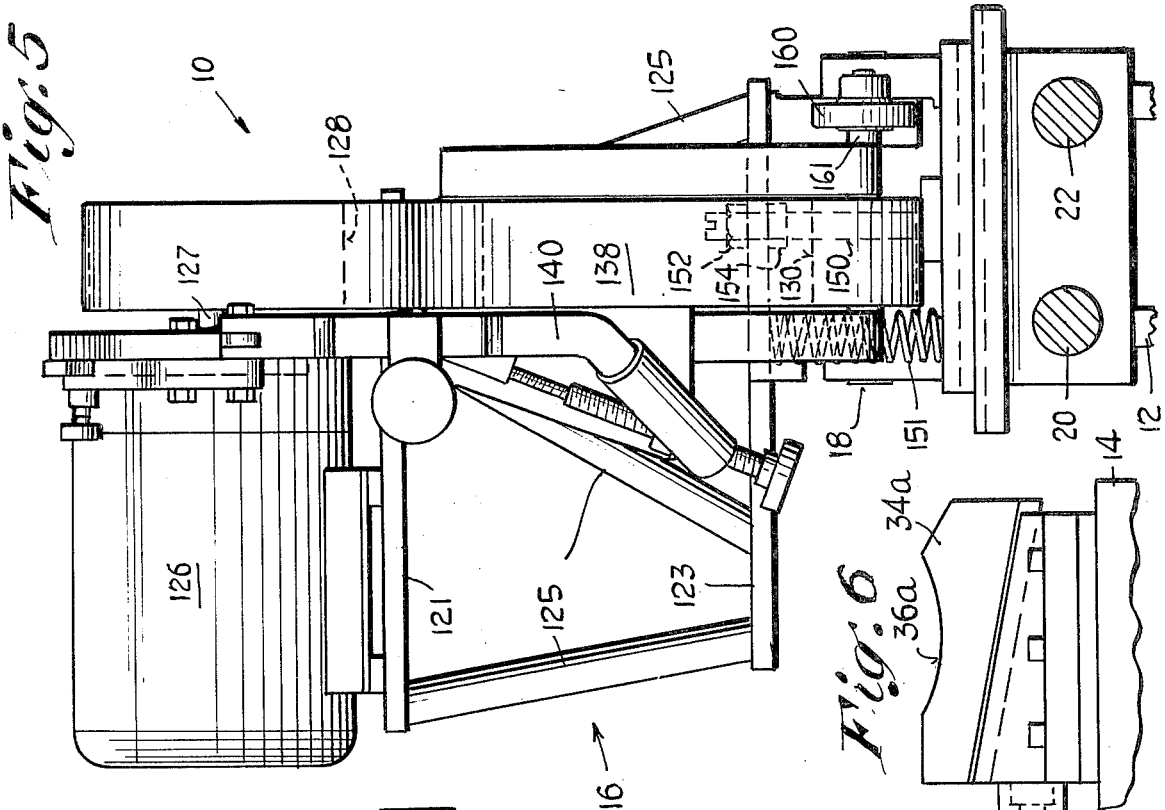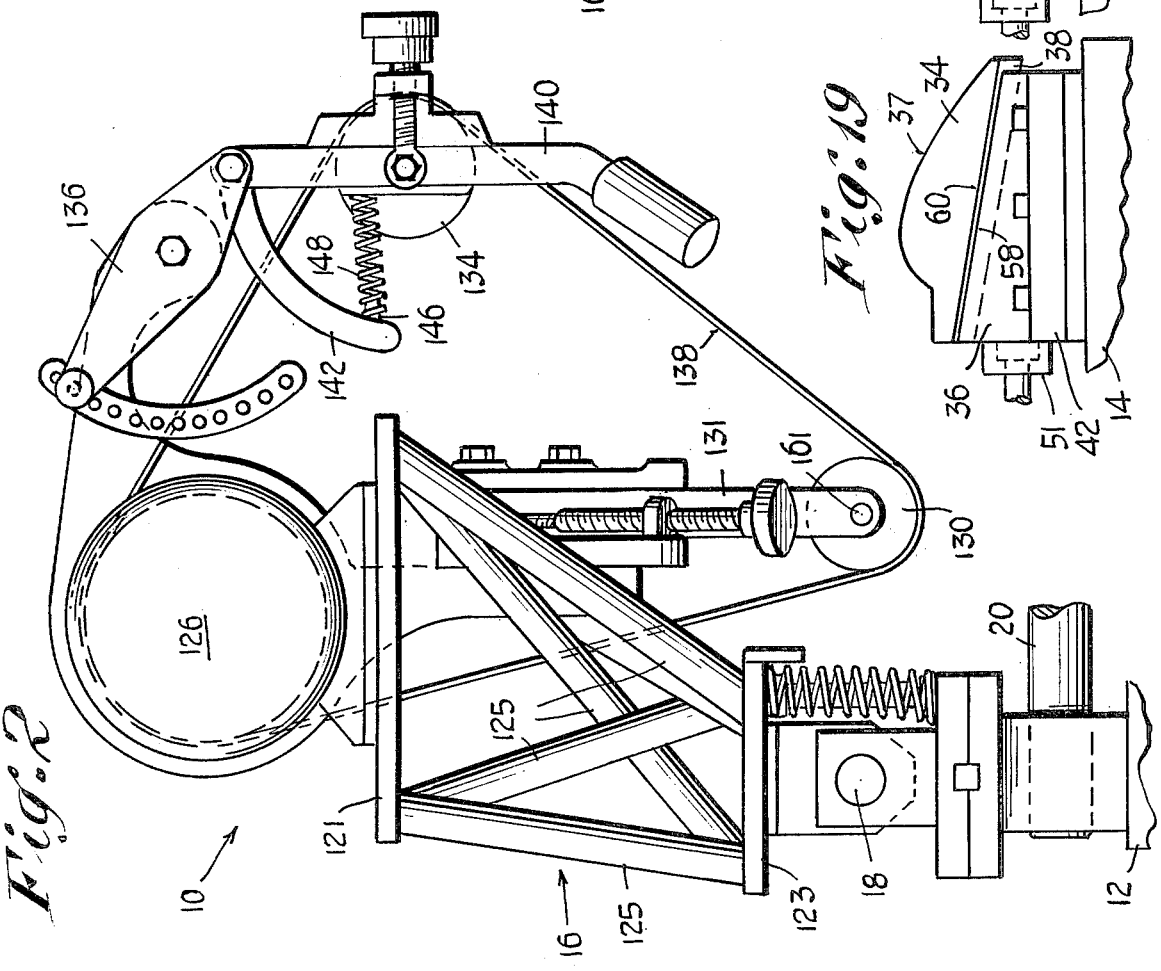

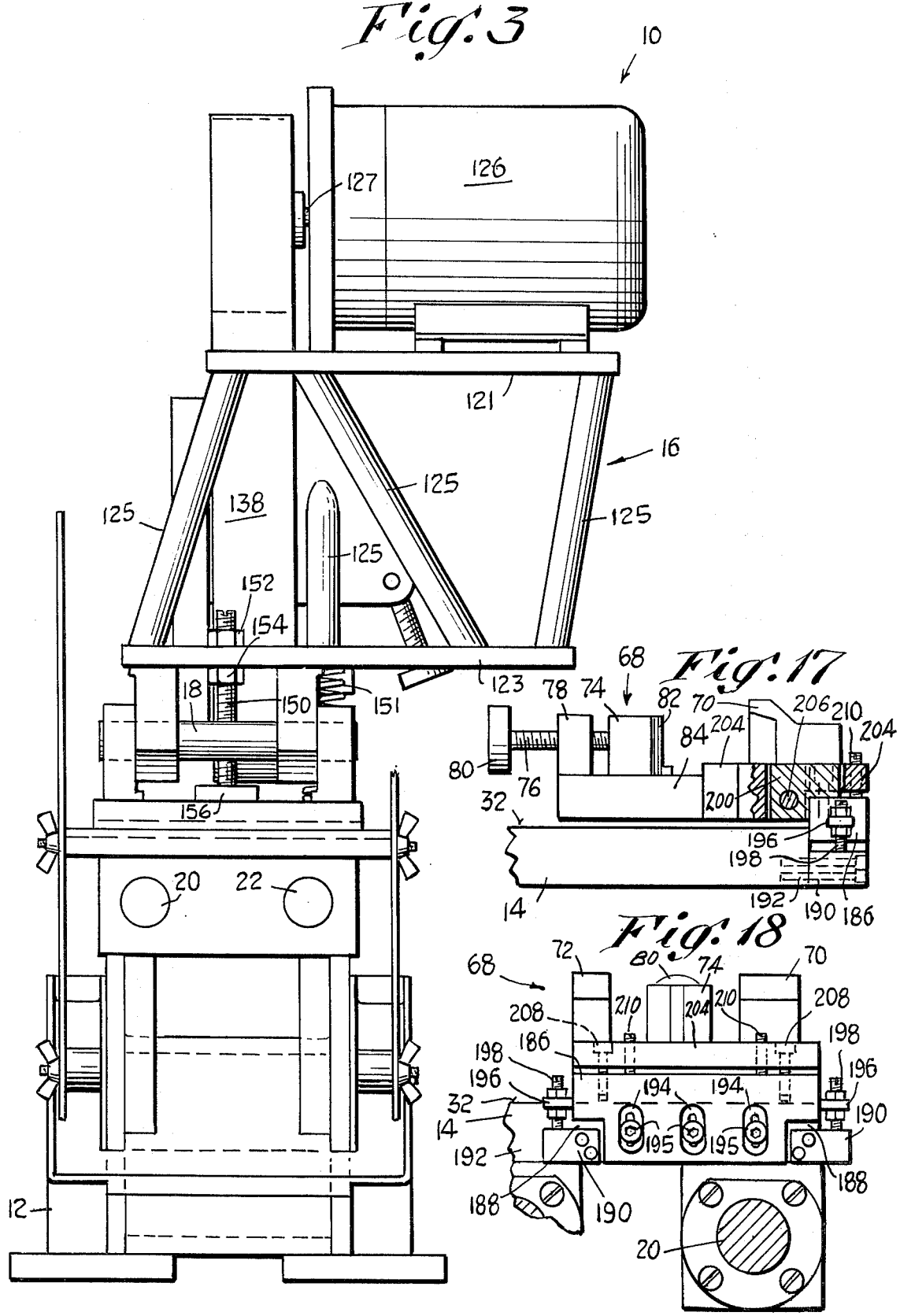

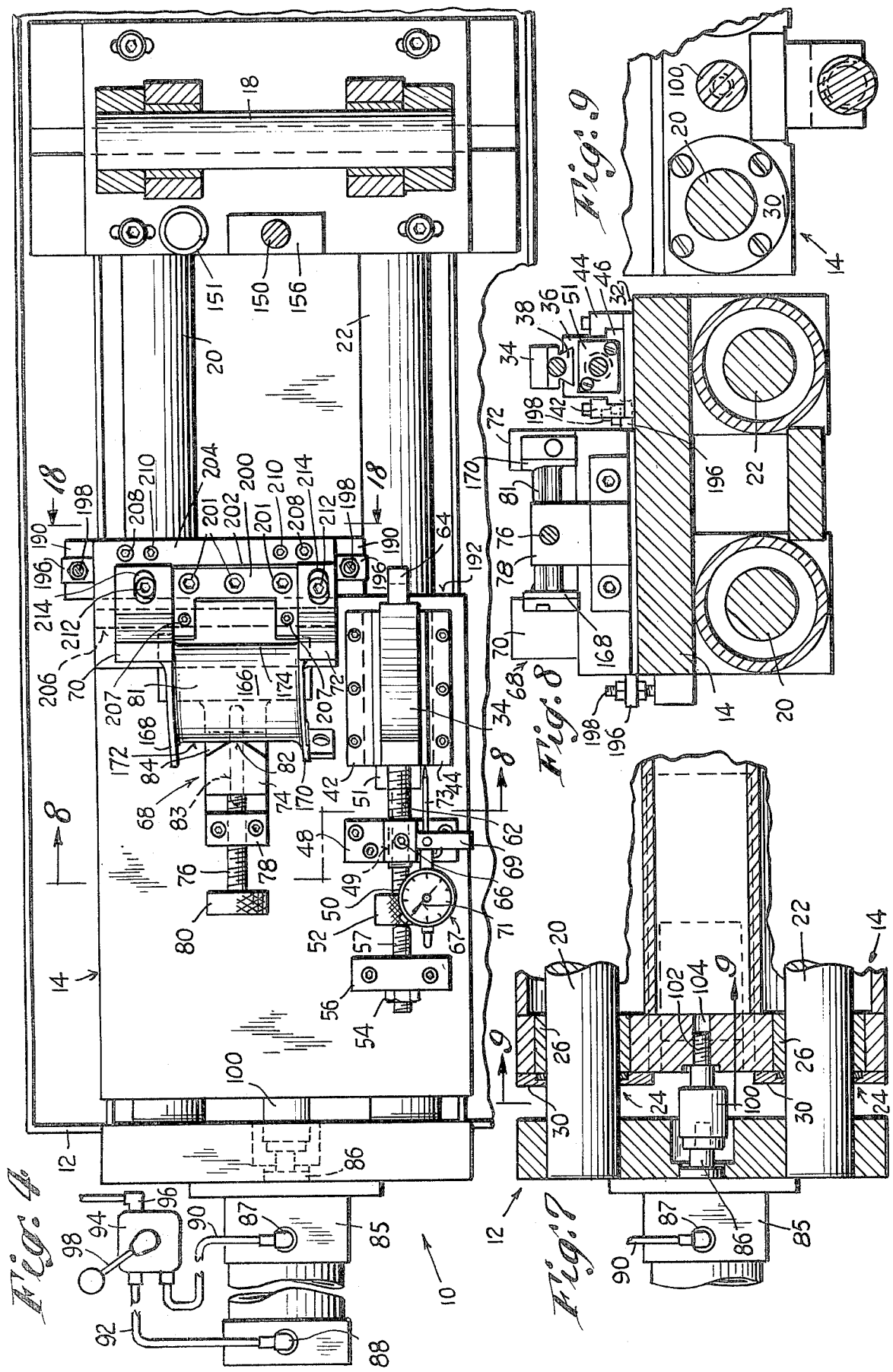

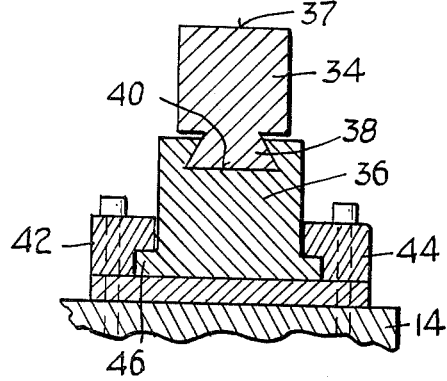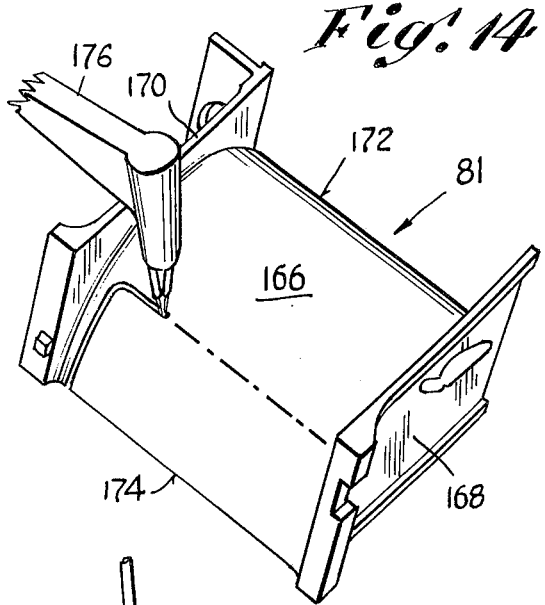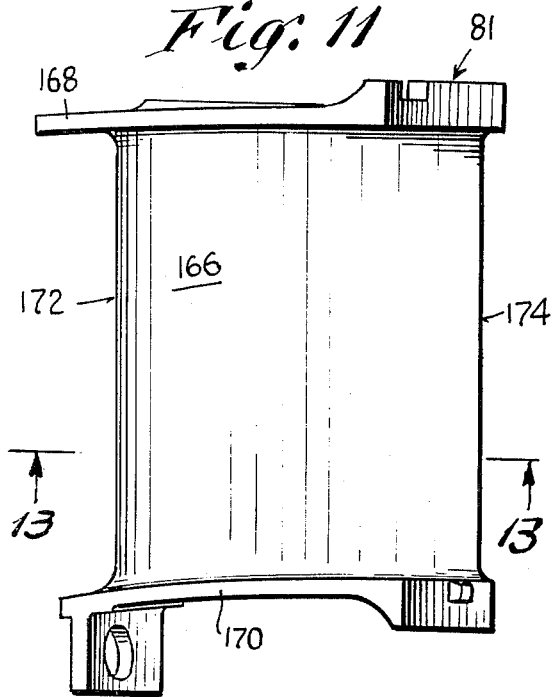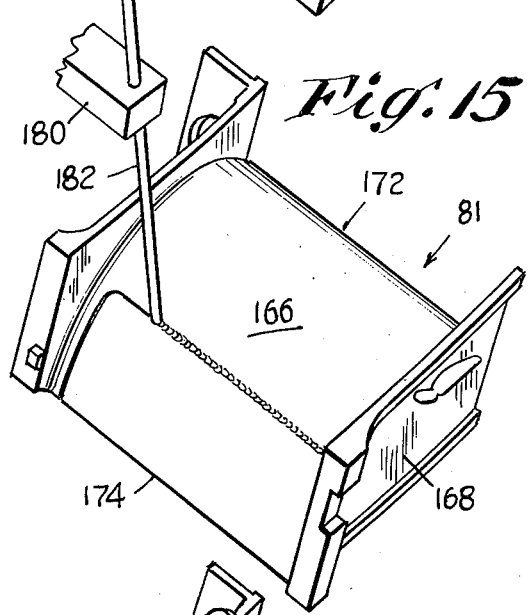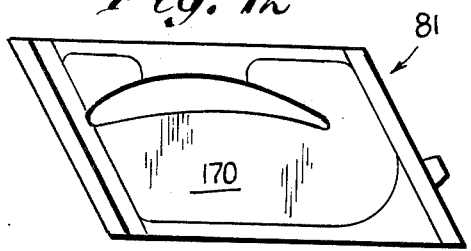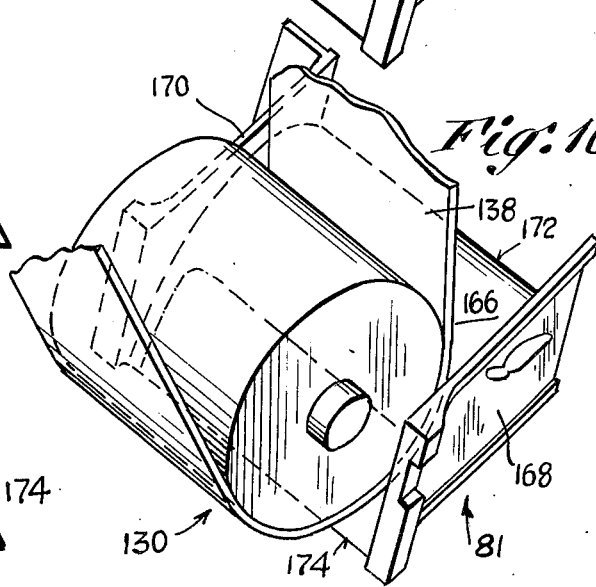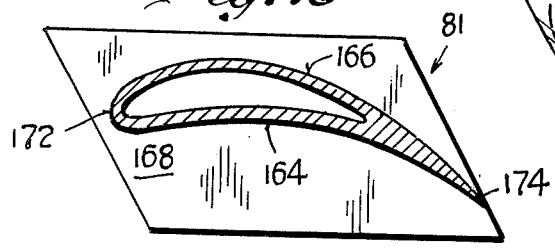

MACHINE FOR RESURFACING TURBINE VANES

BACKGROUND

This invention relates generally to resurfacing devices, and more particularly to devices of this type which are adapted to impart a particular curvature or contour to a workpiece.

In the past, problems occurred with blades or vanes of the type employed in turbine engines, where the vane has become damaged or worn after prolonged periods of use. When this occurs, replacement of the particular vane is usually required. Where substitutions have been made using newly fabricated vanes, the cost has been very substantial, since such parts are generally expensive to manufacture. As an alternate approach, resurfacing of the vane has been undertaken. In some cases, portions of the damaged surface have been filled with welding or brazing material, suitably fused in place, and the resulting surface then contoured so as to constitute a close duplication of the original surface.

However, it has been found to be rather costly and difficult to closely duplicate the original surfaces. In addition, it is important that the vanes of a given engine have the same general surface configuration. When such resurfacing has been undertaken by hand or with prior surfacing equipment, satisfactory uniformity between the various units has been difficult or impossible to obtain. Moreover, the added material which was constituted as brazing or welding substance did not have the required hardness and stability under high speed that characterized the material of the vane as originally fabricated. In consequence, the repaired vanes were found to be defective and deficient, and usually did not have a satisfactorily long, useful life cycle to warrant their installation.

SUMMARY

The above disadvantages and drawbacks associated with prior resurfacing of turbine vanes are obviated by the present invention, which has for an object the provision of a novel and improved method and resurfacing device, the latter being especially simple in its construction, reliable in operation and providing excellent uniformity between multiple vanes which have been resurfaced in succession. A related object is the provision of an improved method of resurfacing or restoring blades wherein the originally specified material is used as replacement for the worn blade portions, and the provision of a device as above characterized, wherein the particular workpieces or units to be resurfaced can be readily clamped in place, contoured, and removed with a minimum of time, and with minimum adjustment of the device during an extended period of use.

Still another object of the invention is to provide an improved resurfacing device as above outlined, wherein the specific contour imparted to a restored workpiece can be readily adjusted and changed within limits, if necessary, to provide specific curvatures as might be required.

These objects are accomplished by the provision of a resurfacing machine comprising a machine bed carrying a pair of supports which are capable of limited advancing and retracting movement with respect to one another. One of the supports is slidably carried on a pair of substantially parallel, coextensive guide bars secured to the bed, and has a camming device engageable with a cam follower disposed on the other support. The latter is mounted for pivotal movement on the bed, and carries a motor driven sanding belt adapted to engage a workpiece clamped in place at a work-performing station of the first support. Movement of the first support brings the workpiece into engagement with the sanding belt as the support moves. When this occurs, the cam follower is simultaneously engaged by the cam, causing pivotal movement of the second support in a way that the particular contour or shape of the cam is imparted to the workpiece. Means are provided for effecting automatic advancing and retracting movement of the first support with respect to the bed, and for halting such movement when predetermined positions have been attained. Additional means are provided for adjusting the position of the cam with respect to the first support and workpiece, thus enabling variation to be effected in the degree of resurfacing of the particular vane being machined.

Other features and advantages will hereinafter appear.

In the drawings, illustrating several embodiments of the invention:

FIG. 2 is a fragmentary left side elevational view of the machine of FIG. 1.

FIG. 3 is a rear elevational view of the resurfacing machine of FIGS. 1 and 2.

FIG. 4 is a top plan view taken on line 4—4 of FIG. 1.

FIG. 5 is a fragmentary front elevational view of the resurfacing machine of FIGS. 1-4.

FIG. 6 is a fragmentary side elevational view of a cam having a modified contour for imparting a concave surface characteristic to the under surface of a turbine vane.

FIG. 7 is a fragmentary horizontal section taken on line 7—7 of FIG. 1.

FIG. 8 is a fragmentary vertical section taken on line 8—8 of FIG. 4.

FIG. 9 is a fragmentary vertical section taken on line 9—9 of FIG. 7.

FIG. 10 is a fragmentary vertical section taken on line 10—10 of FIG. 1.

FIG. 11 is a top plan view of a typical turbine vane of the type to be resurfaced by the device of FIGS. 1-10.

FIG. 12 is a side elevation of the vane of FIG. 11.

FIG. 13 is a section taken on line 13—13 of FIG. 11.

FIG. 14 is a perspective view of a worn turbine vane illustrating the worn portion being cut away by a torch.

FIG. 15 is a perspective view of the turbine vane of FIG. 14 illustrating a new vane portion being welded in place where the worn portion was removed.

FIG. 16 is a perspective view of the turbine vane of FIG. 15 with the new portion and areas adjacent thereto being refinished by a rotating, abrasive drum.

FIG. 17 is a fragmentary view partly in side elevation and partly in section of the mounting device employed to clamp the workpiece in place on the bed.

FIG. 18 is a section taken on line 18—18 of FIG. 4.

FIG. 19 is an enlarged, fragmentary side elevation of the cam employed with the embodiment of FIG. 1.

Figure 1:
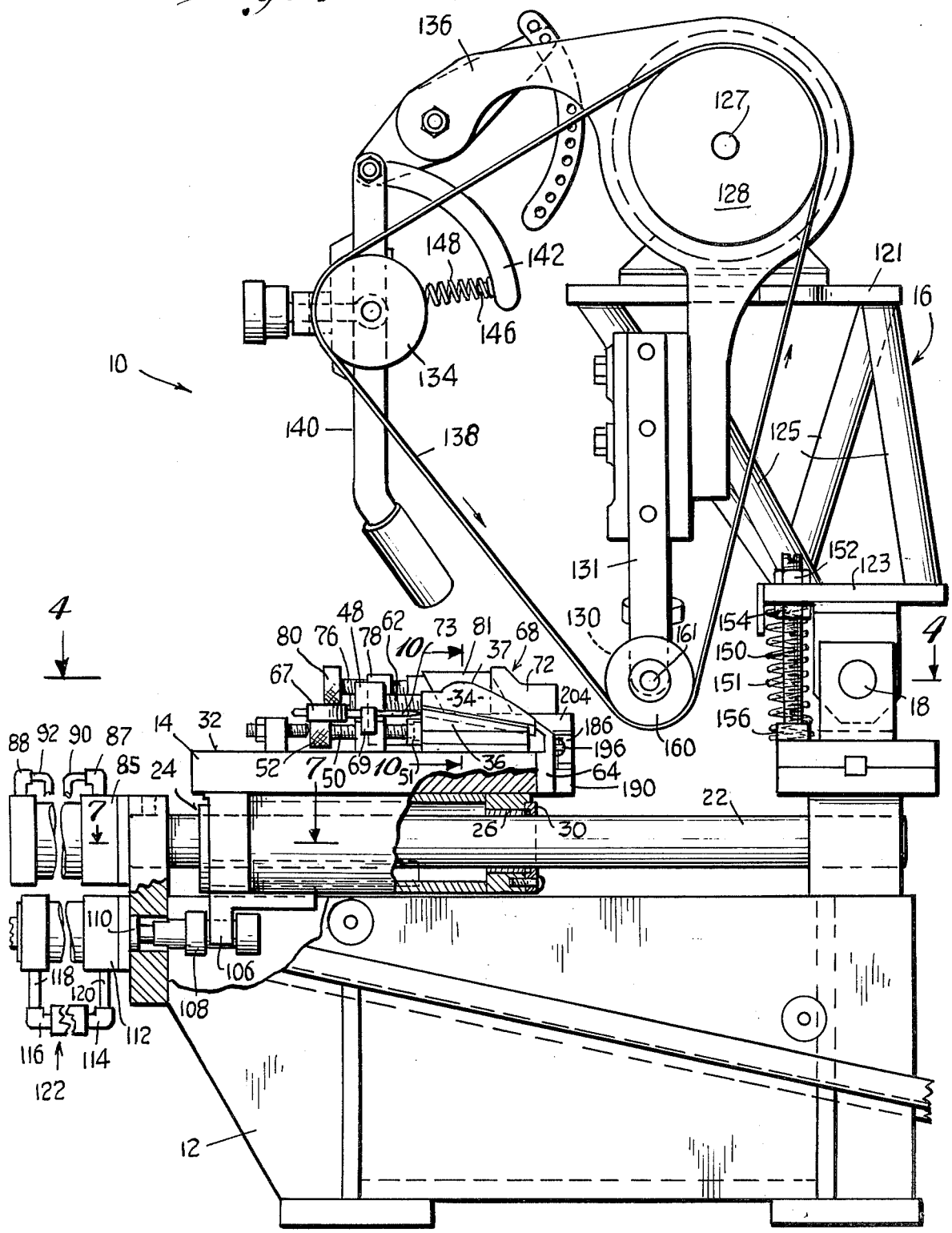
FIG. 1 is a right side elevational view of the improved turbine vane resurfacing machine of the present invention.

Referring to FIGS. 1-5 and in accordance with the present invention, there is provided a resurfacing machine generally designated by the numeral 10 for imparting a desired surface contour to a workpiece, such as a turbine vane or the like. The machine comprises a bed or base 12 on which there is carried a movable carriage 14 constituting a first support or support member, and an arm 16 constituting a second support or support member which is pivotally mounted on the bed 12 by means of a pin 18. The bed 12 carries a pair of substantially parallel, coextensive guide bars 20, 22 (FIGS. 4, 8) on which the carriage is adapted to slidably move. In accomplishing this, the latter has four slide bearings 24, two of which are illustrated in FIG. 7, the other two being disposed on the opposite end of the carriage and engaging the bars 20, 22. Each bearing 24 comprises a sleeve 26 held in place by means of an abutment plate 30 (FIG. 9). The bearings and the coextensive bars constitute a guide for enabling limited reciprocating movement of the carriage with respect to the bed.

The carriage 14 comprises a substantially flat, upper surface 32 constituting a work area, having an adjustable cam 34 movable between fixed limits with respect thereto, and a slide block 36 by which the cam is secured to the carriage 14. The cam 34 has a convex surface 37 (FIG. 19) resembling the contour of one surface of a turbine vane, as will be explained below. As shown in FIG. 10, the cam 34 is provided with a dovetail slide portion 38 by which it is held captive in a grooved formation 40 on the slide block 36. The latter is held down by means of a pair of supports 42, 44 having undercut configurations which receive flange portions 46 of the slide block 36.

Referring again to FIGS. 1 and 4, there is provided an adjustable means for shifting the slide block 36 with respect to the carriage in a direction substantially in line with its direction of movement parallel to the bars 20, 22, the means comprising a block 48 having a threaded hole 49, and a screw 50 disposed therein, constituting a fine adjustment for positioning the slide block 36. The block 48 is rigidly mounted on the upper surface 32 of the carriage. Carried on the screw 50 is a thumb wheel 52. A second block 56 carries an additional screw 57 and a locking nut 54. The screw 57 constitutes a stop for the thumbwheel 52. The screw 50 engages the slide block 36 by means of a push-pull (captive) coupling 51. It will be understood that this coupling enables relative turning movement of the screw with respect to the slide block 56, but prevents relative movement between the two parts in a direction parallel to the screw axis. By such an arrangement, as the screw 50 is rotated by means of the thumb wheel 52, the slide block 36 (and screw 50) will undergo movement in a direction parallel to the axis of the screw. In FIG. 19 it will be seen that the slide block 36 has a sloped upper wedging surface 58 engaging a similarly sloped lower wedging surface 60 of the cam 34. By such an arrangement, as the slide block 36 moves, the cam 34 will either be raised or lowered with respect to the carriage 14.

Carried on the upstanding block 48 is an additional fine screw adjustment 62 having one end engaging the cam 34. Another part of the latter is held by means of a clamp 64 mounted on the carriage 14. A set screw 66 carried in the block 48 locks the position of the screw 62 once a suitable adjustment has been obtained. It will be understood that one end of the screw 62 merely frictionally bears against the corresponding end of the cam 34. The arrangement is such that the latter can undergo limited movement in a vertical direction toward or away from the bed, with respect to the carriage 14, but is restrained from horizontal movement over the bed, such vertical movement being effected by adjustment of the position of the slide block 36.

FIGS. 1 and 4 illustrate a gauge or indicator device generally designated by the numeral 67 carried by an upstanding arm 69 on the carriage 14. The device comprises a dial and pointer assembly 71, and a sensing arm 73 which is biased into engagement with a portion of the end surface of slide block 36. It will be understood that movement of this sensing arm is reflected in changes in the reading of the indicator, as the position of the cam 34 is adjusted in a vertical direction. Thus, a precise positioning of the cam can be effected, with repeatability on the order of several thousandths of an inch.

Referring to FIGS. 1, 4, 8, 17 and 18, there is provided on the carriage 14 and disposed at the upper surface 32 thereof a clamping means or device for holding the piece to be resurfaced. The clamping device comprises a vise 68 having a pair of fixed jaws 70, 72 with undercut configurations, and a movable jaw 74. The latter is engaged by an advanceable screw 76 with a push-pull captive coupling similar to that employed with the screw 50 and slide block 36, the screw 76 being received in an upstanding block 78 rigidly mounted on the upper surface of a guide block 84. A thumb wheel 80 permits adjustment of the screw 76, and effects advancing and retracting movement of the jaw 74 with respect to the jaws 70, 72. A tapered portion 82 of the jaw 74 is adapted to engage a point on the straight edge portion of the turbine vane 81 to be machined. The jaw 74 is slidably received in a groove 83 of the guide block 84, as particularly illustrated in FIGS. 4 and 17.

Considering now FIGS. 1, 4 and 7, there are provided power means disposed on the machine bed 12 for effecting automatic advancing and retracting movement of the carriage 14, with respect to the arm 16, the means comprising a hydraulic air cylinder 85 having a piston 86 associated therewith. The cylinder 85 has a pair of fittings 87, 88 to which there are connected hydraulic lines 90, 92 respectively, which in turn are connected to a valve 94. The latter has an inlet 96 adapted to be connected to a source of air under pressure (not shown) and a lever 98 for effecting communication between the inlet 96 and either of the lines 90, 92, one at a time. The cylinder employed is commercially known by the designation "Miller Air Cylinder Model No. A61B". It will be understood that depending on the position of the lever 96, pressure will be transmitted to either the fitting 87 or the fitting 88, which will result in movement of the piston 86 in one of two opposite directions. Connected with the piston 86 is a flexible coupling 100, the latter carrying a threaded rod 102 which is received in a tapped hole 104 in the carriage 14. The arrangement is such that movement of the piston 86 will in turn drive the carriage along the parallel guide bars 20, 22.

Looking at FIG. 1, it will be seen that the carriage 14 (hereinafter also referred to as a carriage member) carries an angular plate 106 at its underside, which in turn is engaged by a second coupling 108 connected to the piston 110 of a second cylinder 112. This latter device is of the type known by the commercial designation "Miller Hydraulic Cylinder Model No. DJ61B" and has fittings 114 and 116 connected by means of lines 120, 118 with a valve device 122. An actuator lever (not shown) for the valve permits adjustment of the flow of hydraulic fluid therethrough. This latter cylinder device thus provides a dampening effect, constituting a speed control for the movement of the carriage 14. It will be understood that by either opening or closing the valve, the drag imparted to the carriage 14 can be varied to provide a suitable rate of advancing movement. In this particular arrangement, the position of the valve controls the carriage speed during travel in either direction. The cylinder 112 thus constitutes fluid means on the bed for regulating the relative speed of the supports with respect to one another.

Referring again to FIGS. 1-3, the arm 16, constituting the second support member, comprises an upper support plate 121, a lower support plate 123, and a plurality of connecting rods 125. Mounted on the upper plate 121 is an electric motor 126 having a shaft 127 carrying a drive pulley 128. In addition, there is provided a resurfacing device comprising an abrasive or sanding drum 130 on a first extremity 131 of the arm 16, and an idler pulley 134 carried on a second extremity 136 of the arm. A sanding belt 138 extends around the two pulleys 128, 134 and around the drum 130 as shown, the abrasive surface of the belt being disposed on the side not engaging the pulleys. The idler pulley 134 is carried on a lever 140 which is pivotally mounted on the arm 16. The latter has an extension 142 adjacent the lever 140 which carries a boss 146. A compression spring 148 is received on the boss 146 and biases the lever 140 and pulley 134 in a direction tending to maintain the tension of the sanding belt 138. The motor constitutes powered means for driving the belt while enabling the arm 16 to have limited pivotal movement. The pivotal axis of the arm 16 is conicidental with that of the pin 18, the carriage 14 being disposed forwardly of these axes. The carriage thus moves in a plane which is substantially parallel to the pivotal axis of movement of the second support.

As shown in FIGS. 1 and 2, the arm carries an adjustable stop means in the form of a screw 150, which is disposed in fixed relation to the arm 16 by means of nuts 152 and 154. An abutment plate 156 carried on the machine bed 121 constitutes a stop. By such an arrangement, the "rest" position of the arm, as well as that of the motor 126 and pulleys 128, 130, 134 is determined by the adjustment screw 150. In addition, there is provided a compression spring 151, having one end engaging the machine bed adjacent the location of the stop 156 and the other end engaging the arm 16 so as to counterbalance the latter, thus reducing the effective weight of the motor on the arm, and tending to maintain the stop means inoperative.

Considering FIG. 5, there is provided a cam follower in the form of a wheel 160, which has a broad cylindrical surface in line with the curved surface 37 of the cam 34. The cam follower 160 is adapted to engage the cam 34 as the carriage moves between its predetermined end limits, as will be explained below, and has essentially the same diameter as the abrasive drum 130. Both the drum 130 and the wheel 160 are mounted for free-turning on the same shaft or spindle 161.

FIGS. 11-13 illustrate a typical turbine vane 81. As shown, it comprises a concave surface 164 and a convex surface 166 which are disposed between two substantially parallel end plates 168, 170. The intersections of the two surfaces 164, 166 define two parallel edge portions 172, 174. In FIGS. 4 and 8, the plates 168, 170 are received edge-wise in the jaws 70, 72 of the vise 68, and the edge 172 is engaged by the jaw 74, when it is desired to operate on a particular piece.

The operation of the improved turbine vane resurfacing device may now be readily understood. With the motor 126 energized, the sanding belt 138 will be running at a high rate of speed around the pulleys 128, 130 and 134. It has been found that superior results are obtained with the belt running in the direction indicated in FIG. 1. When the valve 94 is actuated so as to provide pressure to the inlet fitting 88, the carriage 14 will begin to move to the right, as viewed in FIG. 1. As this is done, the cam follower or wheel 160 will begin to engage the curved surface 37 of the cam 34. Simultaneously, the sanding belt 138 (backed by the drum 130) will engage the convex surface 166 of the workpiece, and will begin to remove minute portions of this surface, as determined by the position of the arm. Movement of the carriage toward the right will cause pivoting of the arm 16 in a clockwise direction, as viewed in FIG. 1, for a short interval until the crest of the curved surface 37 is reached, after which further movement will cause pivoting in the opposite direction. It is seen that the position of the sanding belt and wheel 130 is governed according to the characteristics of the particular surface configuration of the cam. The cam 34 and cam follower 160 thus constitute cooperable guide means on the supports 14, 16 for effecting relative movement between the workpiece and resurfacing movements of the supports 14, 16, such that contoured portions of the workpiece can be resurfaced as the supports change their relative positions.

Following a complete traversal of the surface 37, the air cylinder 85 is reversed, and the carriage commences movement toward the left in FIG. 1. During this reverse stroke, additional resurfacing is imparted to the workpiece via the sanding belt 138. It will be understood that the cam follower or roller 160 remains engaged with the surface 37 during the entire interval of contact between the sanding belt and the workpiece, and that the degree of pressure exerted by the sanding belt on the workpiece is determined by the relative stiffness of the compression spring 151. It is noted that the clamping device is adapted to hold the turbine vane or workpiece 81 in side-by-side alignment with the cam such that the surfaces 37 and 166 define a common curvature.

Means are provided within the air cylinder device 85 for halting the movement of the carriage 14 when a predetermined position has been reached, in order to avoid jamming of the latter with the guide bar supports on the machine bed.

FIG. 6 illustrates a slightly modified cam 34a, having a convex surface 36a adapted to be engaged by the cam follower or wheel 160 during pivoting or tilting movement of the arm 16. This particular cam is employed to shape or contour the concave surface 164 of the vane in FIGS. 11-13. The operation of this cam in connection with the resurfacing machine is similar to that described above and consequently need not be repeated. It will be understood that cams having other contours aside from those shown could be readily employed, and the invention is not intended to be limited to the particular configuration or shapes of the two cams disclosed herein.

Referring to FIGS. 14-16 the present invention also embraces the method of resurfacing or restoring a worn turbine vane 81. After a period of operation and use, the turbine vanes tend to become worn at the surface 166 in the vicinity of the edge 174, such wearing being apparent by lines of abrasion, parallel to the end plates 168, 170. The method of the present invention includes the steps of cutting out the worn surface of the vane in the vicinity of such wearing as with a torch 176 shown in FIG. 14, welding a new piece of material in place to fill the vacancy of the cut out piece as shown in FIG. 15, and refinishing the surfaces 166, 168 of the vane at the welds and at areas adjacent thereto by means of an abrasive drum, as shown in FIG. 16. Welding is accomplished by suitable apparatus comprising an electrode 180 connected to a source capable of supplying suitably high current (not shown) and a welding rod 182. The abrasive drum 130 comprising the sanding belt 138 is similar to that employed in the refinishing machine described above, however, the method of the invention is not intended to be restricted to the use of the apparatus disclosed hereinabove.

The invention further provides a unique and advantageous adjustable mounting device (FIGS. 4, 8, 17 and 18) for carrying the clamping means or jaws 70, 72 and 74 on the support or carriage member 14 whereby said means can have adjustable translating movement in a given plane, and can also have adjustable pivotal movement about an axis extending transversely of the direction of said translational movement, and further adjustable pivotal movement about a second axis disposed transversely of the first-mentioned axis. The said mounting device comprises a carrier bar or member 186 having end notches 188 in its lower portion, providing clearance for shoulder blocks 190 which are secured to the end 192 of the carriage member 14. The carrier member 186 has a plurality of adjoining vertical slots 194 receiving draft cap screws 195 which are threaded into the carriage end 192. Extending from the ends of the carrier 186 are ears 196 carrying adjustment screws 198 which bear on the shoulder blocks 190 and have lock nuts. The screws 198 can effect translational shifting and adjustment of the carrier 186 at such times that the draft screws are loose. Tightening of the draft screws secures the member 186 in the position determined by the adjusting screws 198.

Rigidly attached to the member 186 is a U-shaped pivot-rod mount 200, as by suitable cap screws 201. The mount 200 is disposed in a U-shaped aperture 202 of a flat block 204 which mounts the jaws 70, 72 and 74 and which constitutes part of the clamping means for the workpieces 81. The mount 200 carries a pivot rod 206 held in place by set screws 207, the rod passing through the two legs of the mount 200 and through adjoining portions of the flat block 204 whereby the latter is pivotally supported on the mount 200 and carrier member 186, and thereby on the carriage member 14.

A locking means in the form of cap screws 208 and set screws 210 coacting between the carrier member 186 and flat block 204 fix the pivotal position of the latter, expecially those portions thereof on which the jaws 70, 72 are carried. Also, a very minute amount of twist-type adjustment can be had with the screws 208, 210 so as to effect relative canting of one clamp jaw 70 with respect to the other jaw 72, as can be understood. This, with a slot adjustment of the jaws 70, 72 permits a precise positioning of the workpiece 81 held by the jaws. The slot adjustment of the jaws 70, 72 comprises cap screws 212 which pass through slots 214 in the jaws and are threaded into the flat block 204 as seen in FIG. 4.

By the above arrangement a precise adjustable positioning of the workpieces 81 is possible, with respect to the carriage member 14, whereby tight refinishing tolerances can be met and maintained.

The guide block 84 which carries the movable jaw 74 is constituted as part of the clamping means for the workpieces 81, being specifically an integral part of the flat block 204.

The plane of translational movement indicated above could be a plane parallel with (or coincidental with) the plane of the paper in FIG. 18. The first-mentioned axis would then be parallel with (or coincidental with) the axis of a line perpendicular to the plane of the paper in FIG. 18, and the second axis would be perpendicular to the plane of the paper in FIG. 17 and coincidental with the axis of the pivot rod 206, for example.

From the above it can be seen that I have provided a novel and improved turbine vane resurfacing method and machine, the latter being extremely simple in construction and providing an excellent degree of uniformity from one vane to another, as well as providing ease of operation and freedom from maintenance.

The device thus represents a distinct advance and improvement in the technology of resurfacing machines.

Variations and modifications are possible without departing from the spirit of the invention.

I claim:
1. A resurfacing machine comprising, in combination:
  a. a machine bed having a pair of support members thereon, capable of relative advancing and retracting movement with respect to each other,
  b. means on one support member, for clamping a workpiece to be resurfaced,
  c. a resurfacing device on the other support member, adapted for engagement with said workpiece to perform operations thereon,
  d. cooperable guide means on said support members, operative in response to the relative movements therebetween, for effecting relative movement between the workpiece and resurfacing device in directions different from the support member movements whereby contoured portions of the workpiece can be resurfaced as the support members change their relative positions,
  e. a mounting device, carrying said clamping means on the support member for compound adjustment,
  f. said mounting device enabling the clamping means to have translational adjusting movement in a given plane, and to have pivotal movement about an axis extending transversely of the direction of said translational movement,
  g. said mounting device providing for pivotal adjusting movement of the clamping means about a second axis disposed transversely of said first-mentioned axis,
  h. said mounting device comprising a carrier member having a plurality of adjoining slots,
  i. draft screws passing through said slots and into one of said support members, for adjustably securing the carrier member to said support member, and
  j. adjustment screws on one of said two immediately preceding members and engageable with the other member, for effecting relative shifting of the members by minute amounts at such times that the draft screws are loose.

2. A resurfacing machine as in claim 1, wherein:
  a. said mounting device comprises a pivot engaged with the clamping means, and b. a pivot mount secured to the carrier member, rigidly mounting the pivot along said second axis.

3. A resurfacing machine as in claim 2, wherein:
a. the pivot comprises a rod passing through said pivot mount and clamping means.

4. A resurfacing machine as in claim 3, wherein:
a. the clamping means comprises a flat block and a pair of spaced-apart jaws mounted atop the block for receiving said workpiece,
b. said flat block having an aperture in which the pivot mount is disposed,
c. said carrier member extending below the level of the flat block, and engaging under portions of said pivot mount.

5. A resurfacing machine as in claim 4, and further including:
a. means for adjustably securing the spaced jaws to said flat block for positioning in different locations thereon.

6. A resurfacing machine as in claim 3, and further including;
a. means for locking the clamping means in different pivotal positions with respect to said pivot mount.

7. A resurfacing machine comprising, in combination:
a. a machine bed having a pair of support members thereon, capable of relative advancing and retracting movement with respect to each other,
b. means on one support member, for clamping a workpiece to be resurfaced,
c. a resurfacing device on the other support member, adapted for engagement with said workpiece to perform operations thereon, and
d. cooperable guide means on said support members, operative in response to the relative movements therebetween, for effecting relative movement between the workpiece and resurfacing device in directions different from the support member movements whereby contoured portions of the workpiece can be resurfaced as the support members change their relative positions,
e. said resurfacing device comprising a drum and an abrasive belt running around the drum,
f. a pivoted arm constituting said other support, having a spindle carrying the drum,
g. screw-adjustable stop means limiting movement of the arm in one direction, and
h. counterbalancing means connected directly with the arm, acting against the weight of the same, and biasing it in a direction tending to maintain said stop means inoperative.

8. A resurfacing machine as in claim 7, and further including:
a. powered means for driving said belt while enabling said arm to have limited pivotal movement.

9. A resurfacing machine comprising, in combination:
a. a machine bed having a pair of support members thereon, capable of relative advancing and retracting movement with respect to each other,
b. means on one support member, for clamping a workpiece to be resurfaced,
c. a resurfacing device on the other support member, adapted for engagement with said workpiece to perform operations thereon, and
d. cooperable guide means on said support members, operative in response to the relative movements therebetween, for effecting relative movement between the workpiece and resurfacing device in directions different from the support member movements whereby contoured portions of the workpiece can be resurfaced as the support members change their relative positions,
e. said guide means comprising a cam on one support member, a cam follower, and means rigidly carrying the latter on the other support member,
f. rigid means adjustably mounting the cam on its support member for limited movement toward and away from the bed to predetermined fixed positions with respect thereto, and
g. a fine adjustment for changing the position of the cam on its support member,
h. said adjustable mounting means comprising a block carried on the carriage and having a wedging surface,
i. said cam having a cooperable wedging surface engaged with the block.

10. A resurfacing machine as in claim 9, wherein:
a. said cooperable wedging surfaces comprise a dovetail slide.

11. A resurfacing machine comprising, in combination:
a. a machine bed having a pair of support members thereon, capable of relative advancing and retracting movement with respect to each other,
b. means on one support member, for clamping a workpiece to be resurfaced,
c. a resurfacing device on the other support member, adapted for engagement with said workpiece to perform operations thereon,
d. cooperable guide means on said support members, operative in response to the relative movements therebetween, for effecting relative movement between the workpiece and resurfacing device in directions different from the support member movements whereby contoured portions of the workpiece can be resurfaced as the support members change their relative positions, and
e. a mounting device, carrying said clamping means on the support member for compound adjustment,
f. said mounting device enabling the clamping means to have translational adjusting movement in a given plane, and to have pivotal movement about an axis extending transversely of the direction of said translational movement,
g. said mounting device providing for pivotal adjusting movement of the clamping means about a second axis disposed substantially perpendicular to said first-mentioned axis.

* * * * *